United States Patent
Roch et al.

(10) Patent No.: US 7,448,374 B2
(45) Date of Patent: Nov. 11, 2008

(54) COOKING COMPARTMENT DOOR OF A COOKING OVEN HAVING A PYROLYSIS FUNCTION

(75) Inventors: Klemens Roch, Trostberg (DE); Michael Wagner, Traunstein (DE); Frank Jördens, Traunstein (DE); Bernhard Walter, Bernstadt (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 200 days.

(21) Appl. No.: 11/058,081

(22) Filed: Feb. 10, 2005

(65) Prior Publication Data

US 2005/0145241 A1    Jul. 7, 2005

Related U.S. Application Data

(63) Continuation of application No. PCT/EP03/09189, filed on Aug. 19, 2003.

(30) Foreign Application Priority Data

Aug. 21, 2002   (DE)   ................... 102 39 180

(51) Int. Cl.
*F23M 7/00* (2006.01)
(52) U.S. Cl. .................. 126/200; 126/190; 219/740
(58) Field of Classification Search ............ 126/190, 126/198, 200; 52/171.1; 106/287.14; 219/740
See application file for complete search history.

(56) References Cited

U.S. PATENT DOCUMENTS

| | | | | |
|---|---|---|---|---|
| 4,014,312 A | * | 3/1977 | McKelvey et al. | ........ 126/198 |
| 4,207,863 A | * | 6/1980 | Drouin | ........ 126/198 |
| 4,898,147 A | | 2/1990 | Doni et al. | |
| 5,919,851 A | * | 7/1999 | Yamaguchi et al. | ........ 524/268 |
| 6,024,084 A | * | 2/2000 | Gerhardinger | ........ 126/200 |
| 6,231,999 B1 | * | 5/2001 | Krisko | ........ 428/627 |
| 6,601,575 B2 | | 8/2003 | Gros et al. | |
| 2002/0084263 A1 | * | 7/2002 | Wennemann et al. | .... 219/460.1 |

FOREIGN PATENT DOCUMENTS

| | | |
|---|---|---|
| DE | 197 05 120 A1 | 8/1998 |
| DE | 198 14 211 A1 | 10/1999 |
| DE | 100 07 923 C1 | 10/2001 |
| DE | 100 50 609 A1 | 4/2002 |
| EP | 0 355 406 B1 | 2/1990 |

OTHER PUBLICATIONS

International Search Report.

* cited by examiner

*Primary Examiner*—Alfred Basichas
(74) *Attorney, Agent, or Firm*—Russell W. Warnock; James E. Howard

(57) ABSTRACT

A cooking compartment door of a cooking oven having a pyrolysis function in the cooking compartment, includes a borosilicate glass pane forming at least a portion of the cooking compartment door. The borosilicate glass pane is provided at least in sections with a colored layer. The colored layer provides impact resistance to the borosilicate glass pane by being applied to the surface of the borosilicate glass pane on the side opposite the cooking compartment. The colored layer is resistant to temperatures up to four hundred degrees Celsius and is not joined to the borosilicate glass pane surface by melting.

12 Claims, No Drawings

COOKING COMPARTMENT DOOR OF A COOKING OVEN HAVING A PYROLYSIS FUNCTION

The invention relates to a cooking compartment door of a cooking oven, for example, an electric cooker to be cleaned pyrolytically according to the preamble of claim 1.

In domestic cooking ovens having the performance feature "pyrolytic self-cleaning", food residue burned onto the oven wall is pyrolysed at interior temperatures typically of the order of magnitude of 500° C. Said residue can then easily be removed as ash lying on the bottom of the oven. The pyrolytic temperatures, substantially higher compared with the normal operating temperatures of a domestic cooking oven, require the use of high-quality glasses for glazing the cooking compartment door. Borosilicate glasses have successfully been used for this purpose.

It is also known to glaze the cooking compartment door of a domestic cooking oven in a multi-walled fashion and in this case to provide the surface of the inner door glass facing the door interior space with an enamelled coloured imprint or glass-flux-based imprint by means of a stoving process at around 600-800° C. By this means, for example, usage instructions for the user, which are to a certain extent continuously made clear during operation of the cooking oven, and also creative emphasis, can be achieved.

It has been found that the impact strength of glass panes printed in this fashion is considerably reduced especially with respect to effects of impacts on the side of the glass pane facing away from the printing, probably as a result of ion exchange between the glass flux or enamel and the borosilicate pane to be printed.

It is thus known from DE 100 07 923 C1 to apply a corresponding imprint to the door surface facing the cooking oven (baking oven) since this is the surface exposed to effects of impacts during use of the cooking oven. However, the known glass fluxes have a high lead content and the lead gradually dissolves from the surface of the coloured layer under strong heating (in the range of pyrolysis temperatures) and enters into the baking compartment. As a result, in extreme cases adverse health effects can be caused to the user. In addition, a coloured layer of the known type has a rough surface with only a limited satisfactory aesthetic charm.

It is thus the object of the invention to provide an improved cooking compartment door for a cooking oven with a pyrolysis function which on the one hand is sufficiently impact-resistant and on the other hand, completely eliminates any health hazards for the user and in addition, has a satisfactory aesthetic charm.

The object is solved by a cooking compartment door having the features of claim 1.

The invention on the one hand includes the idea of providing, instead of the known enamel or glass flux coloured layers for printing the borosilicate glass pane, a coloured layer not joined to its surface by melting, i.e. that the coloured layer is joined to the borosilicate pane at a temperature which makes it possible to achieve adhesion of the coloured layer to the borosilicate pane. Such an adhesion temperature lies in the range of a condensation or cross-linking temperature of the coloured layer at around 150-200° C. The adhesion temperature is thus significantly lower than a transformation temperature or an incipient melting temperature of the borosilicate pane. As a result of the comparatively low temperature during joining of the coloured layer to the borosilicate pane, a disadvantageous influence on the surface structure of the thermally pre-stressed borosilicate pane is prevented. Thus, the impact strength of the borosilicate pane is not impaired by the application of the coloured layer. The invention further includes the idea of providing a coloured layer herefor which is temperature-resistant up to at least 400° C. (in year-long normal operation of a cooking oven). Finally, the invention also includes the idea of providing this coloured layer on the surface of the door facing away from the cooking compartment or the baking oven, unlike the previous corresponding developments in enamel or glass-flux printed layers. Any evaporation of contaminants from the coloured layer into the cooking compartment is thus prevented.

The invention provides a cooking compartment door which has a smooth surface with a high-quality aesthetic charm, which is extremely shock- or impact-resistant and from which no health substances can escape.

In a first advantageous development of the inventive idea, the coloured layer is substantially bonded using an organic binder. The binder preferably comprises a silicone resin or fluoropolymer or a binder having both components of this type.

In an alternative embodiment of the invention hereto, the coloured layer is bonded using an inorganic binder, for which especially water glass and/or sol gel binders can be considered.

In both variants pigments or dyes known per se for corresponding glass colours are used insofar as these are compatible with the mentioned types of binders and have sufficient high-temperature strength.

The cooking compartment door is printed with the aforementioned coloured layer, in a manner likewise known per se, preferably by means of a screen printing method in accordance with the ergonomic or creative specifications, wherein for example, a 77 T or 100 T screen printing fabric can be used. Before printing the glass surface provided with the printing is preferably cleaned using a suitable organic solvent (especially a lower alcohol or acetone) and a means which improves the adhesion to the glass surface is possibly added to the colour mixture.

For aesthetically particularly demanding implementations, an (especially high-gloss) clear varnish or blocking varnish based on an organic or inorganic binder can additionally be applied to the coloured layer to avoid damage.

For special applications it is additionally possible to have a combination of the proposed printing not joined to the glass surface by melting with a further coating fused in a known fashion on the opposite or also the same glass surface.

In one exemplary embodiment of the invention for a decorative, heat-resistant coating of a cooking compartment door, a silicone combination resin with a predominant polysiloxane fraction and a fraction of a heat-resistant polyester resin is used as binder and inorganic metal compounds, possibly a titanium dioxide of the rutile type are used as pigments.

A high-heat-resistant varnish for the door coating is made from a pure methyl polysiloxane that is mixed with a metal powder, possibly aluminium bronze or zinc dust, in the ratio 1:3. Said silicone resin varnishes are hardened at temperatures in the range of or above 200° C.

The execution of the invention is not restricted to these examples but is also possible using a plurality of other screen-printable varnish systems whose temperature resistance is known to the person skilled in the art and whose application is thus within the scope of action of the person skilled in the art.

The invention claimed is:

1. A cooking compartment door of a cooking oven having a pyrolysis function in a cooking compartment therein, comprising:

a borosilicate glass pane forming at least a portion of the cooking compartment door, said pane provided at least in sections with at least one colored layer;

said cooking compartment door closing the cooking compartment on a first side thereof;

said colored layer applied to the surface of said borosilicate glass pane on a second opposite side of said door facing away from said cooking compartment; and said colored layer applied to said surface of said borosilicate glass pane at a temperature of about one hundred fifty (150) degrees Celsius to about two hundred (200) degrees Celsius wherein said colored layer is applied without melting and joined to said pane and wherein said colored layer is resistant to temperatures at least up to about four hundred (400) degrees Celsius.

2. The cooking compartment door according to claim 1, including said colored layer is applied and substantially bonded to said surface of said borosilicate glass pane with at least one of an organic and an inorganic binder.

3. The cooking compartment door according to claim 2, including said organic binder is at least one of a silicone resin and a fluoropolymer.

4. The cooking compartment door according to claim 2, including said organic binder is at least one of a water glass binder and a sol gel binder.

5. The cooking compartment door according to claim 1, including said colored layer is applied in a structured fashion to said surface by screen printing.

6. The cooking compartment door according to claim 1, including said colored layer applied to said surface of said borosilicate glass pane without melting is combined with a coating fused to said surface.

7. The cooking compartment door according to claim 1, including at least one further layer associated with said colored layer is a barrier layer for protecting said colored layer deposited on said surface of said borosilicate glass pane prior to applying said colored layer.

8. The cooking compartment door according to claim 7, including said barrier layer protects said colored layer at least by one of protecting said colored layer from the penetration of liquid media into said colored layer and providing mechanical protection for said colored layer.

9. The cooking compartment door according to claim 1, including said one further layer substantially inhibits incident infrared radiation on to said colored layer.

10. The cooking compartment door according to claim 1, including at least two further layers, one of said further layers substantially inhibits incident infrared radiation on to said colored layer and the other of said further layers is a barrier layer for protecting said colored layer deposited on prior to applying said colored layer.

11. The cooking compartment door according to claim 10, including said incident infrared radiation inhibiting layer is deposited on said surface of said borosilicate glass pane prior to applying said barrier layer.

12. The cooking compartment door according to claim 1, including said colored layer is applied in at least one of a grid form and a lettered form to said surface.

* * * * *